United States Patent
Gresset et al.

(10) Patent No.: US 7,557,700 B2
(45) Date of Patent: Jul. 7, 2009

(54) PROTECTION SYSTEM OF A WORK STATION BY NETWORK-CENTRALISED MANAGEMENT

(75) Inventors: Eric Gresset, Jouy (FR); Jean-Pierre Billiard, Luce (FR)

(73) Assignee: SAAA SAS Systemes d'Automatismes d'Alarmes Automatiques, Gallardon (FR)

( * ) Notice: Subject to any disclaimer, the term of this patent is extended or adjusted under 35 U.S.C. 154(b) by 359 days.

(21) Appl. No.: 11/499,773

(22) Filed: Aug. 7, 2006

(65) Prior Publication Data
US 2007/0030142 A1 Feb. 8, 2007

(30) Foreign Application Priority Data
Aug. 8, 2005 (FR) ................................. 05 52464

(51) Int. Cl.
G08B 29/00 (2006.01)
G06F 7/04 (2006.01)
G08B 19/00 (2006.01)

(52) U.S. Cl. ................ 340/506; 340/5.8; 340/5.81

(58) Field of Classification Search ............... 340/506, 340/5.81
See application file for complete search history.

(56) References Cited

U.S. PATENT DOCUMENTS 6,192,282 B1\* 2/2001 Smith et al. ................... 700/19
2003/0052770 A1\* 3/2003 Mansfield et al. ...... 340/310.01

FOREIGN PATENT DOCUMENTS

FR 2784771 4/2000
GB 2346469 8/2000

\* cited by examiner

*Primary Examiner*—Donnie L Crosland
(74) *Attorney, Agent, or Firm*—Young & Thompson

(57) ABSTRACT

A telesurveillance system of objects whose presence is monitored remotely by a computerised control station over a computer network. At least one master central station has a unique identifier connected to the network, at least one detector having statuses in relation to the presence or not of an object, the control station being informed of the changes in status via the network, and the user may have a personal identification elements readable by a reader of the master central station, the letter including elements to wait, in a surveillance state, for the changes in status and reading the identification element, to switch to a state of alert to a change in status and to switch to a neutralised state during a determined neutralisation time by reading the personal identification element.

15 Claims, 2 Drawing Sheets

US 7,557,700 B2

PROTECTION SYSTEM OF A WORK STATION BY NETWORK-CENTRALISED MANAGEMENT

BACKGROUND OF THE INVENTION

1. Field of the Invention

The invention relates to a telesurveillance system of the objects which are under the responsibility or not of a user. It finds applications in the field of protection against theft of various equipment, called generically here objects, which one or several users may access and which, for certain of these objects, may be borrowed. It is more particularly applicable to the protection of a work station including objects (computer, screen, drawer, telephone, furniture . . . ) placed at the disposition of one or several users or objects in self service (conference room equipment . . . ). It implements a pre-existing computer network and is therefore particularly well suited to an industrial or office environment (internal and/or external computer network). A master central station suited for use in the system completes the invention.

2. Description of the Related Art

Surveillance against the theft of objects in the commercial field is largely developed and devices are known with detectors attached to objects and connected by a wire-like link to an alarm central station. Such devices are limited to the display racks of commercial objects placed at the disposal of consumers. Because of the evolution of the sales techniques (modification of the presentation, evolutions of the products or changes in the range of products) and of the cost of protection (expensive objects are protected first), the devices implemented are generally rather limited in their extension and should be provided for frequent modifications/evolutions.

Still, one may also find objects which are made available to people in environments other than commercial and it is the case of the work location where the employer may make pieces of equipment (tools, computer hardware, communication hardware . . . ) available to users, pieces of equipment whereof the cost may be relatively important. Risks of theft are hence also present on the work location, not so much by the person in charge of the objects made available to him on his work location, but by third parties who may benefit from an absence of the person in charge to take away an object.

The work location is generally fitted with a computer network and connection outlet to said network are available in the various work stations and the system of the invention will hence use this means of communication to ensure the telesurveillance of objects made available to one or several users on a work station.

Thus, the invention concerns a telesurveillance system by master central station of objects of a user in a basic location, the presence of the objects in this basic location being monitored remotely by a computerised control station over a computer network and via said computer network.

BRIEF SUMMARY OF THE INVENTION

According to the invention, at least one master central station having a unique identifier is connected on the one hand to the network and on the other hand to at least one detector placed in relation to an object, the separation of the detector from the object or placing it in relation thereto causing changes in status of the detector transmitted to the master central station, the control station being informed (in real time or quasi-real time) of said changes in status via the network, and the user may have a personal identification means readable by a reader of the master central station and said master central station comprises means: to wait, in a surveillance state, for the changes in status of the detectors and reading the means of identification, to switch to a state of alert further to the change in status of the detector corresponding to at least the separation, to switch to a neutralised state during a determined neutralisation time when the user causes the master central station to read his personal identification means, the identification read corresponding to an identification authorised by the system, said neutralised state avoiding a master central station in surveillance state to switch to a state of alert or bringing back to a surveillance state a master central station which was in a state of alert, to inform the control station of an alarm of at least one separation when the state of alert has been maintained for a time period greater than a determined pre-alarm time period.

In various embodiments of the invention, the following means which may be used solely or according to all the technically possible combinations, are employed:

the computer network is a single entity internal network, (for example INTRANET)

the computer network is a global network, (for example INTERNET)

the control station is connected by a computer link (INTRANET, EXTRANET, INTERNET individually or in combination) to at least one piece of remote computer equipment, said piece of remote computer equipment being informed of the alarms, the control station is connected by a telephone link (RTC or cellular radio telephone) to at least one piece of mobile or fixed telephone equipment, said piece of mobile telephone equipment being informed of the alarms by vocal messages, the personal identification means is a card or badge (any medium which may comprise an electronic chip) with a contact reading chip, (the master central station then includes a suitable reader)

the personal identification means is a card or badge (any medium which may comprise an electronic chip) with a contactless reading chip, (the master central station then includes a suitable reader)

the personal identification means is a barcode card or badge, (the master central station then includes a suitable reader)

the personal identification means is a magnetic track card or badge, (the master central station then includes a suitable reader)

the personal identification means consists in reading a biometric parameter of the user, (the master central station then includes a suitable reader)

in the state of alarm, acknowledging the reading of the means of identification brings back to the neutralised state, in the state of alarm, acknowledging the reading of the means of identification brings back to the surveillance state, the master central station includes moreover means so that in a state of alert, said master central station transmits an audible alert sound signal (continuous or discontinuous) and/ or a visible alert visual signal, (for example turning on a LED fixedly or flashing)

the master central station includes moreover means so that, when the master central station has informed the control station of an alarm, said master central station transmits for a determined alarm duration or until acknowledgement by the control station, an audible alarm sound signal (continuous or discontinuous) and/or a visible alarm visual signal (for example turning on a LED fixedly or flashing), the neutralised state preventing/stopping said alarm sound and/or visual emission, the intensity of the alarm sound signal is greater than that of the alert sound signal, the master central station includes moreover means to switch to a state of alert further to any change in status of the detector and to inform the control station of an alarm of said change in status when the state of alert has been maintained for a time period greater than a determined pre-alarm time period, the system includes moreover means so that switching to the neutralised state takes place only if the identification read corresponds to an authorised user identification for the corresponding master central station, (searching for a match between the identification read of the user and an identification stored in the system of an authorised user for the master central station in question)

the master central station includes moreover means so that switching to the neutralised state takes place only if the identification read corresponds to an authorised user identification for the corresponding master central station, at least one identification of authorised user is stored locally in the master central station or in a detector connected to the master central station (by implementing a digital detector), the corresponding detector includes a non-volatile storage memory (re-programmable ROM, flash® or backed-up for example) of at least one identification of authorised user, the corresponding master central station includes a non-volatile storage memory (re-programmable ROM, flash® or backed-up for example) of at least one identification of authorised user, the identification of authorised user stored locally (in the master central station or the corresponding detector) comes from the control station by the network, the input for local storage of the identification of authorised user (in the master central station or the corresponding detector) is performed directly on the master central station by the connection on the master central station or the detector of a local programming module, the identification of authorised user stored locally (in the master central station or the corresponding detector) comes from the control station by the network or has been stored directly locally by connection on the master central station or the detector of a local programming module, searching for a match between the identification read and an authorised identification is performed either by the master central station, or in the control station, in the case of the control station, the identification read as well as the identifier of the corresponding master central station are sent by the network to the control station which has a storage memory of at least one authorised identifier for a given master central station, the result of the search for a match between the identification read+identifier of master central station and those+those authorised stored in the control station being sent back by the network to the corresponding master central station, an absence of response as regards the result at the end of a determined waiting time is equivalent to an absence of match for the master central station, each detector has a unique detector identifier for a given master central station, the information of change in status of a detector sent to the control station is accompanied by the identifier of master central station and of the detector affected, the master central station (and/or the control station according to whether the searching for a match is performed solely in the master central station or with the control station, hence more generally: the system) includes moreover means so that switching to the neutralised state is only efficient (in practice prevents any switching to the state of alert or authorises switching of the state of alert to the surveillance state) only if the identification read corresponds to an authorised user identification for the corresponding master central station and the corresponding detector, (the authorisations are processed up to the detector level)

the detector(s) are connected either directly to the central station or via at least one distributor slave module, the link between the central station, the possible slave module(s) and the detector(s) is wire-like, the link between the central station, the slave module(s) is by radiofrequency waves, the detectors operate in all or nothing, (it may be detected only in the presence and the absence of the object or cut-off of the link to the detector), the detectors operate according to analogue levels, (on top of the presence and the absence of the object, the attempts of sabotage may be detected, detectors of at least 4 states corresponding to a detector connected or not and detector separate or not from the object), the detectors operate according to a digital mode, (on top of the presence of the object, the attempts of sabotage may be detected, detector of at least 4 states corresponding to a detector connected or not and detector separate or not from the object), the control station comprises means enabling to check periodically whether each master central station remains connected to the network, and when a master central station is not connected any longer, a disconnection alarm is triggered in the control station, the network is wire-like and each master central station is power supplied by the network, the network is wire-like and each master central station is supplied by its own mains, the supply of the master central station is backed-up by an electrochemical source selected among the throw-away batteries or rechargeable batteries, the network is a radio network and each master central station is supplied by its own mains, the mains supply is backed-up by an electrochemical source selected among the throw-away batteries or rechargeable batteries, at least one of the detectors is a perimeter detector, (detection of presence and/or of movement of an individual or object in a space, for example radar RF, infrared detector, light barrier . . . )

a given central station is dedicated to the telesurveillance of the objects of the work station of a particular user, the system includes a ensemble of master central stations for several users with a set of objects whereof some may be usable in common by several users, certain of said objects may be moved temporarily from said basic location for use in another location and the control station comprises means, on the one hand, for counting the time period elapsed since reception by the control station of the information of change in status corresponding to a separation of the detector and, on the other hand, warning when said time period has exceeded a determined authorisation duration, reception of a piece of information of change in status corresponding to a relation (between the object and said detector) cancelling the counting of said period.

The invention also relates to a master central station which is suited for operating in the telesurveillance system over a computer network according to one or several of the previous characteristics and which has a unique identifier, which is connected on the one hand to the network and on the other hand to at least one detector placed in relation to an object, the separation of the detector from the object or placing it in relation thereto causing changes in status of the detector transmitted to the master central station, a control station being informed of said changes in status via the network, and a user may have a personal identification means readable by a reader of the master central station and said master central station including means:

to wait, in a surveillance state, for the changes in status of the detectors and reading the means of identification, to switch to a state of alert suite to the change in status of the detector corresponding to at least the separation, to switch to a neutralised state during a determined neutralisation time when the user causes the master central station to read his personal identification means, the identification corresponding to an identification authorised by the system, said state avoiding a master central station in surveillance state to switch to a state of alert or bringing back to a surveillance state a master central station which was in a state of alert, to inform the control station of at least a separation alarm when the state of alert has been maintained for a time period greater than a determined pre-alarm time period.

The master central station may also comprise one or several means corresponding to those listed previously and which relate thereto.

It should be understood that the invention is not limited to an implementation in the working environment, but may be applied to any environment wherein the objects are made available to people such as for example the rental of equipment, games . . .

BRIEF DESCRIPTION OF THE SEVERAL VIEWS OF THE DRAWINGS

The present invention will now be exemplified without being limited thereto, with the following description in relation to the figures below.

DETAILED DESCRIPTION OF THE INVENTION

Figure 1:
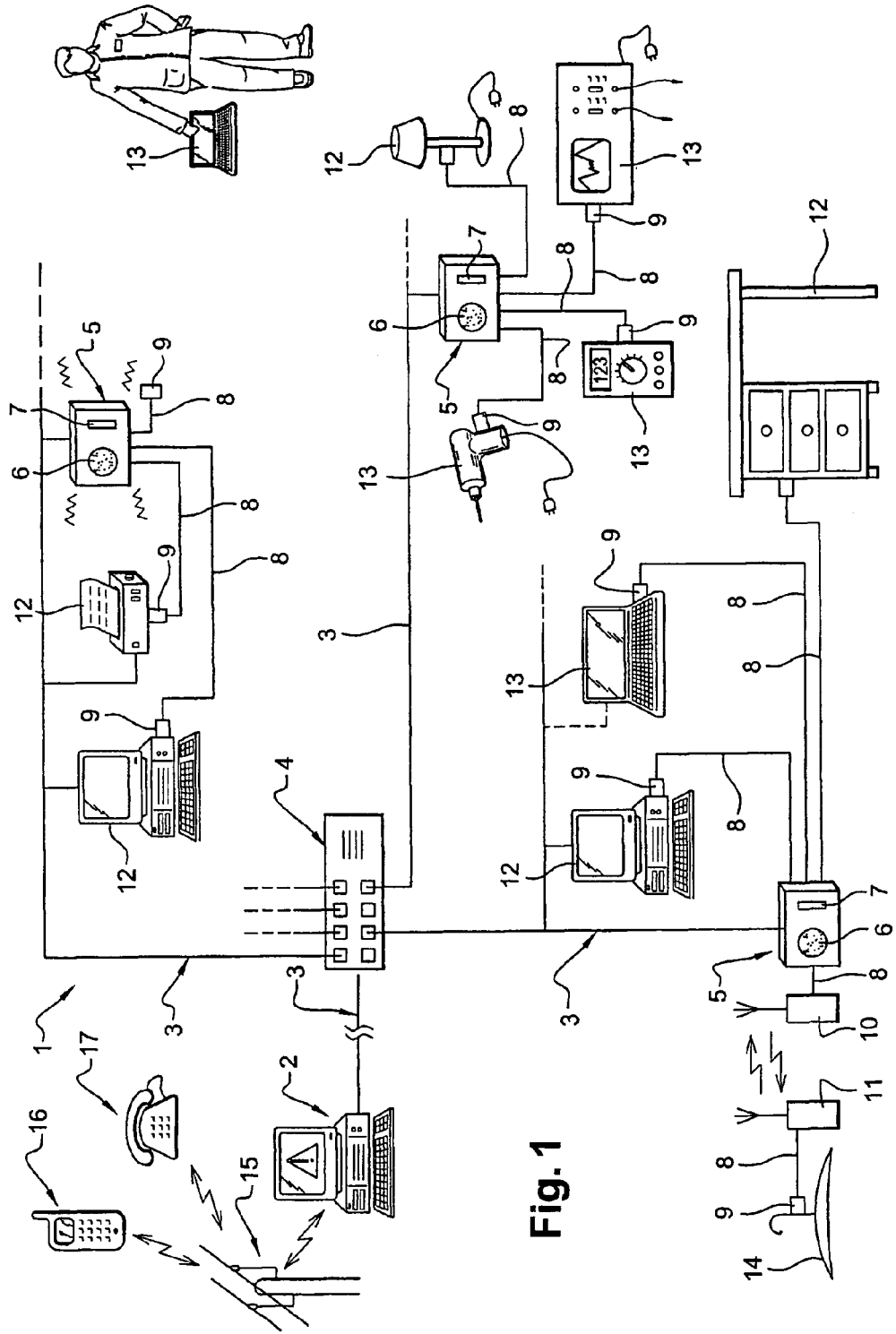
FIG. 1 which represents schematically a system in a example of implementation.

By way of example FIG. 1 represents schematically a firm wherein a portion of the staff are sedentary and another mobile with, for each of these groups, the objects which are more specific thereto. For example the staff of the repair department of this firm may be required to call out and the tools available to them may hence be borrowed and leave the firm. Similarly, the staff of the sales department may be required to leave the firm for visiting clients while taking with them mobile objects. Conversely, another section of the staff that are sedentary, make use of objects which are normally not intended for being moved. Reference 12 designates objects which are normally not intended for being moved (on FIG. 1: desktop computer, printer, illuminating lamp, desk drawer) and under the reference 13 those which may be moved (on FIG. 1: laptop computer, drill, voltmeter, oscilloscope). It should be understood that such distinction is arbitrary and is made only by way of example for explaining the invention. The firm has a computer network, represented in a wire-like form under the reference 3. It should be noted that this network may be any possible network, notably as regards its structure and/or topography (star, ring, tree . . . the combinations thereof) as well as physically (located in a single floor, on several buildings, on several sites . . . ). To underline such fact, FIG. 1 represents a piece of equipment 4 of the network. Moreover, a section of the network may use the radiofrequency waves for the transmissions. Preferably, the network is a network used conventionally, for example of the ETH-ERNET type with a conventional TCP-IP protocol.

A control station, typically a micro-computer 2 or equivalent, is connected to the network. The control station 2, in an enhanced version, is also connected to an external telephone network 15, notably RTC, for vocal communication with mobile 16 or fixed 17 telephone. The control station may also be connected to the outside to communicate data with remote computer equipment (other micro-computer notably) by messaging, exchange of files . . . the typical example being INTERNET.

Master central stations 5 are connected to the network 3. Preferably, the link between the master central station 5 and the network is wire-like and the supply of the master central station is ensured by the network. A master central station 5 includes a sound generator 6, notably a loudspeaker or a buzzer, and a reader 7 of a individual identification means of the users (employees of the firm) as well as electronic means enabling it to operate (microprocessor or micro-controller). The master central station 5 is connected by wire-like links 8 to detectors 9 arranged in relation to the objects 12, 13 to be monitored. The detectors and the aster central stations enable at least to know whether the object is or not in relation to the detector, which corresponds to the statuses of separation (more generally cut-out, object displacement detector disconnected . . . ) and of connection of the detector with the object. The detectors may be of diverse types, passive or active and in the latter case, of the digital type with a memory enabling moreover to store at least one identification of the authorised user. Preferably, each master central station 5 has a unique identifier and each detector has also a unique identifier for a given master central station. When changing status, the control station 2 is informed by receiving the identification of the master central station and of the detector affected.

The master central stations include preferably means of surveillance of the links with the detectors and of the detectors, which enable analogue or digital surveillance (transfer of data) according to the type of detector (analogue or digital detector). It is thus possible to make the master central station communicate with an external programming box unit, notably for inputting locally and storing the identification(s) of authorised users in the central station properly speaking or in a particular digital detector. In case of local input, the identification(s) are preferably transmitted to the control station with the identifier of the corresponding master central station for storage purposes. It may indeed be useful to have in the control station, images of the contents of authorised user identifications stored in the master central stations (notably if the authorisation test is local: authorised identification, or list, in the master central station) if only to be able to restore said contents if, for some reason, one of the contents should get lost, for example in case of replacement of a given master central station or a particular digital detector.

It should be understood that in such a system, it is possible to know precisely the detector of change in status but it cannot be guaranteed that this will correspond to a precise object unless detectors are available which involve the users to bring the object in relation again with its detector specifically assigned. However, it is possible to associate in a database of the control station the reference (number, denomination or other) of an object particular to a specific detector+its specific master central station (their identifiers). It is also possible to perform a cartography of the firm (configuration of the work stations, offices, premises . . . ) and to represent on the control station in said cartography the different detectors and the master central stations and, in case of alarm to view in a particular manner (or to zoom on) the work station/office/premises affected in the cartography.

The concrete physical structure of the system is adapted to the environment to be monitored: the firm may have work stations available in an open space, work stations in partitioned offices, mobile work stations (maintenance truck on site). Thus, preferably, a master central station can be used per each work station of a user and, for example, several master central stations per office may be used if several users share the same office. It is however possible to have a single master central station per office and which is shared between the objects of several users.

In order to enable the possible displacements of objects by authorised users, i.e. without generating any alarms, regardless whether these users are direct (those entrusted with direct responsibility over the objects) or indirect (persons having a privilege authorising them to move objects assigned to other users: general services for example), the users have identification means readable by the master central stations. The system includes hence one (or several according to the distribution) authorisation database enabling to process these authorisations. A user may have an authorisation for a given master central station. The authorisation database includes thus at least one identification (a single authorised user for the master central station in question) or, preferably, a list (several authorised users for the master central station in question) of authorised identifications if it is stored in a given master central station. It includes a list of identifications+identifier of corresponding master central station authorised if it is stored in the central station (said station is in relation with several master central stations and should process the authorisations of the users relative to the master central station identifier). Preferably, the control station includes such an authorisation database and each master central station receives therefrom the authorisation data relating thereto, searching for a match being performed in the master central station. In a more enhanced version, the authorisations may be processed up to the detectors level and in this case the databases include moreover the number of the authorised detector for the master central station and the user identification in question. In the latter case, preferably, the neutralised state is only effective and/or only suppresses the state of alarm of the master central station if the detector+identification (+possibly central station identifier in case of processing by the control station) is acknowledged as authorised. Searching for a positive match corresponds to a authorisation of displacement of object(s) and hence to a recognised reading of identification means (the identification read corresponds to an identification authorised by the system).

The upper section of FIG. 1 represents a stolen laptop computer by an individual not having any personal means of identification readable and/or recognised by the corresponding master central station and which could have enabled to neutralise said central station. The laptop computer 13 has been separated from its detector 9 and the control station has been informed of the change in status of the detector affected (in relation to its master central station), and after an alert duration (pre-alarm starting from a zero value: switching immediately to an alarm status up to few tens of seconds) of the master central station (sound warning) without reading or recognising the means of identification authorising the change in status of said detector (in relation to its master central station), said master central station switches to an alarm state, of which the control station is informed Preferably, the network and the control station 2 are power supplied by a backed-up source so as the master central stations may still be power supplied and the telesurveillance may continue in case of failure of the mains supply. In less enhanced a version, the master central station includes an electrochemical electric source, preferably a buffer battery, and at least one warning/alarm may be transmitted locally in case of change in status of a related sensor.

Finally, the left-hand section of FIG. 1 represents the use of a slave module 10 enabling to create a radio gateway with a radio terminal module 11 connected to a detector 9 by a wire-like link 8 or directly on the terminal module 11. It is thus possible to fit with detectors several objects which are hardly accessible by a wire-like link such as for example a garment on a hanger in a wardrobe.

Figure 2:
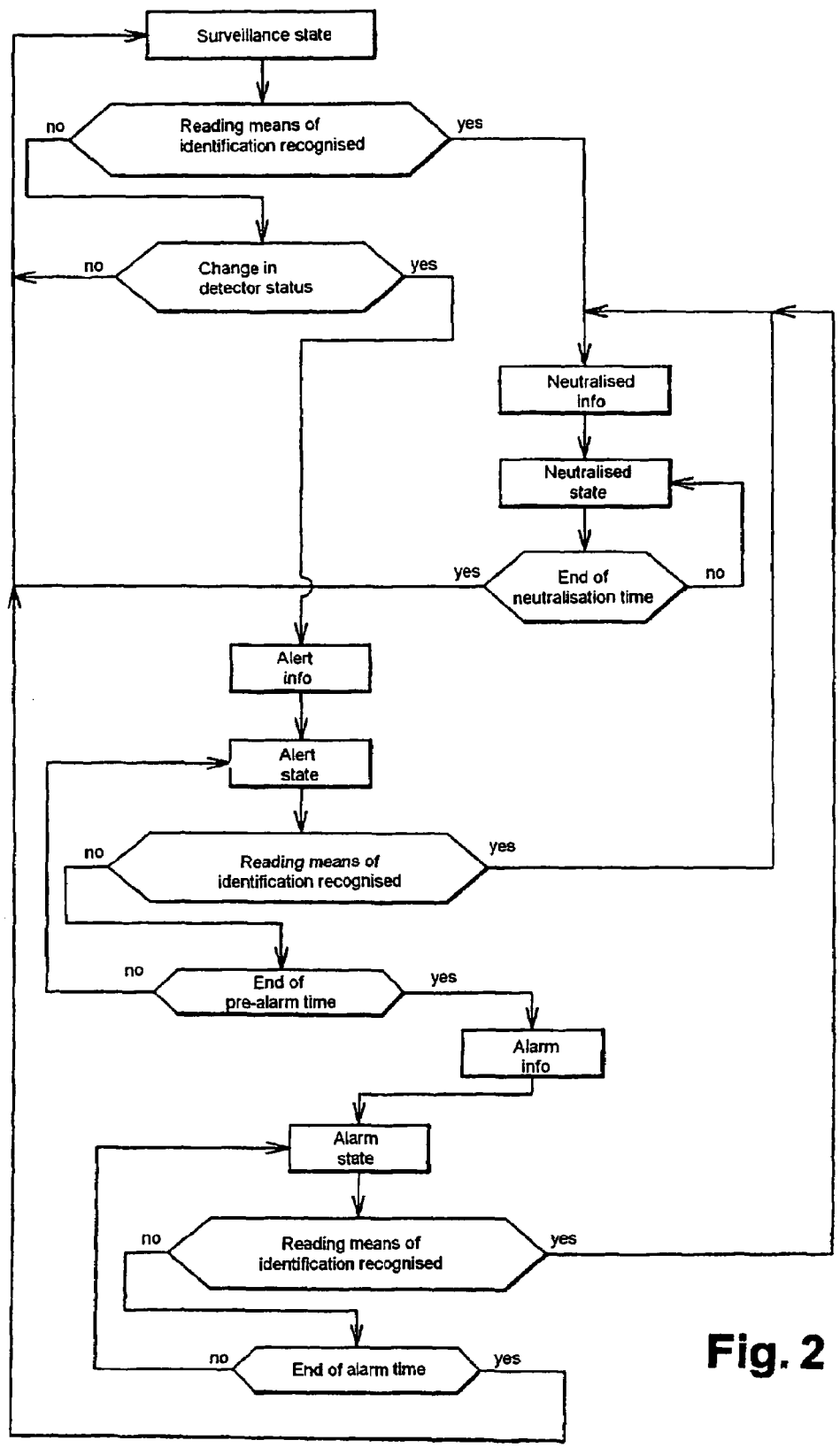
FIG. 2 which represents a flow chart of an example of operation of the system.

The operation example represented on FIG. 2 relates essentially to the master central station. It does not represent the transmission of the changes in status of the detectors nor the response transmitted towards the control station when said station is searching for the presence of the master central stations on the network. It does not represent the installation steps of detectors either and nor the retraction steps of detectors performed by authorised persons and when such authorised changes performed by the control station are taken into account.

The basic state of a master central station is the surveillance state corresponding to the wait either for reading a means of identification which, if it is recognised (identification known by the central station properly speaking or via the control station), involves switching to the neutralised state during a determined neutralisation time, or for a change in status of detector which causes switching to the state of alert (if the master central station is not in the neutralised state).

From this state of alert, up to the expiry of an alert duration (pre-alarm) and in the absence of recognised reading of a means of identification, the master central station switches to the state of alarm.

From this state of alarm, up to the expiry of an alarm duration, the master central station switches back to the surveillance state after acknowledgement by the control station or to follow a recognise reading (authorisation) of a means of identification, the central station switches back to the neutralised state (in a variation, the master central station may switch back directly to the surveillance state).

The control station is informed of each change in status of the master central station by the following procedures: alert info; alarm info; neutralised info. In a variation, the information of neutralisation (procedure: neutralised info) is distinct according to the origin: according to whether it stems from the surveillance state or from the state of alert or from the state of alarm.

It should be understood that this flowchart is purely by way of example and that it may be modified to suit the needs. For example, the state of neutralisation may affect only certain detectors and/or the state of alert may be omitted (when switching directly to the state of alarm) for certain detectors. In practice, the operation of the master central station should enable to monitor and informer continuously and in real-time or quasi-real time the central station of any change in status of detector, i.e. even if the master central station is in a state of alert or a state of alarm, any new change in status should be detected and the central station informed. On the other hand, the control station may include a clock and the system will only authorise (if reading the means of identification is recognised) a separation between object and detector for several hours, outside said hours, an alarm will be triggered immediately.

The invention claimed is:

1. A telesurveillance system by master central station of objects (12,13) of a user in a basic location, the presence of the objects in this basic location being monitored remotely by a computerised control station (2) over a computer network, characterised in that the telesurveillance takes place through communication via said computer network between the control station and the master central station, and in that at least one master central station (5) having a unique identifier is connected to the network and at least one detector (9) in relation to an object, a separation of the detector from the object or placing it in relation thereto causing changes in status of the detector transmitted to the master central station, the control station being informed of said changes in status by communication via the network, and in that the user has a personal identification means readable by a reader (7) from the master central station and in that said master central station comprises means:
   to wait, in a surveillance state, for the changes in status of the detectors and reading the personal identification means,
   to switch to an alert state upon the change in status of the detector corresponding to at least the separation,
   the master central station including a transmission means so that in the state of alert said master central station transmits an audible alert sound signal and/or a visible alert visual signal,
   to switch to a neutralised state during a determined neutralisation time when the user causes the master central station to read his personal identification means, the identification read corresponding to an identification authorised by the system, said neutralised state avoiding a master central station in a surveillance state to switch to a state of alert or the surveillance state a master central station which was in a state of alert,
   to inform by communication via the network, the control station of at least a separation alarm when the state of alert has been maintained for a time period greater than a determined pre-alarm time period.

2. A system according to claim 1, characterised in that the master central station includes the transmission means so that, when the master central station has informed the control station of an alarm, said master central station transmits for a determined alarm duration, or until acknowledgement by the control station (2), a audible alarm sound signal and/or a visible alarm visual signal, the neutralised state preventing/stopping said alarm sound and/or visual emission.

3. A system according to claim 1, characterised in that the master central station includes a switching means to switch to a state of alert upon any change in status of the detector and to inform the control station of an alarm of said change in status when the state of alert has been maintained for a time period greater than a determined pre-alarm time period.

4. A system according to claim 1, characterised in that at least one identification of authorised user is stored locally in the master central station or in a detector connected to the master central station, the master central station or the detector including a non-volatile storage memory of at least one identification of authorised user.

5. A system according to claim 4, characterised in that the identification of authorised user stored in the master central station or the corresponding detector comes from the control station via the network or has been stored directly locally by connection to the master central station or the detector of a local programming module.

6. A system according to claim 1, characterised in that each detector has a unique detector identifier for a given master central station and that the information of change in status of a detector sent to the control station is accompanied by the identifier of the master central station and of the detector affected.

7. A system according to claim 6 characterised in that the master central station includes a switching means so that switching to the neutralised state is efficient only if the identification read corresponds to an authorised user identification for the corresponding master central station and the corresponding detector.

8. A system according to claim 1, characterised in that the control station comprises means enabling to check periodically whether each master central station remains connected to the network, and in that when a master central station is not connected any longer, a disconnection alarm is triggered in the control station.

9. A system according to claim 1, characterised in that the network is wire-like and each master central station is power supplied by the network.

10. A system according to claim 1, characterised in that certain of said objects are moved temporarily from said basic location for use in another location and in that the control station comprises means,
    for counting the time period elapsed since reception by the control station of the information of change in status corresponding to the separation of the detector and,
    warning when said time period has exceeded a determined authorisation duration, the reception of information of change in status corresponding to a relation cancelling the counting of said period.

11. A master central station (5) characterised in that it is adapted to function in the telesurveillance system (1) over a computer network of claim 1 and that it has a unique identifier, that it is connected to the computer network and at least the one detector (9) in relation to an object, the separation of the detector from the object or placing it in relation thereto causing changes in status of the detector transmitted to the master central station, a control station being informed of said changes in status via the computer network, and in that a user has a personal identification means readable by a reader (7) of the master central station and in that said master central station comprises means:
   to wait, in a surveillance state, for the changes in status of the detectors and reading the personal identification means,
   to switch to a state of alert upon the change in status of the detector corresponding to at least the separation,
   the master central station including the transmission means so that in the state of alert said master central station transmits an audible alert sound signal and/or a visible alert visual signal,
   to switch to a neutralised state during a determined neutralisation time when the user causes the master central station to read his personal identification means, the identification corresponding to an identification authorised by the system, said state avoiding a master central station in the surveillance state to switch to a state of alert or the surveillance state a master central station which was in a state of alert, to inform the control station of at least a separation alarm when the state of alert has been maintained for a time period greater than a determined pre-alarm time period.

12. A system according to claim 2, characterised in that the master central station includes a switching means to switch to a state of alert upon any change in status of the detector and to inform the control station of an alarm of said change in status when the state of alert has been maintained for a time period greater than a determined pre-alarm time period.

13. A system according to claim 2, characterised in that at least one identification of authorised user is stored locally in the master central station or in a detector connected to the master central station, the master central station or the detector including a non-volatile storage memory of at least one identification of authorised user.

14. A system according to claim 2, characterised in that each detector has a unique detector identifier for a given master central station and that the information of change in status of a detector sent to the control station is accompanied by the identifier of the master central station and of the detector affected.

15. A system according to claim 2, characterised in that the control station comprises means enabling to check periodically whether each master central station remains connected to the network, and in that when a master central station is not connected any longer, a disconnection alarm is triggered in the control station.

* * * * *